United States Patent [19]
Fujioka

[11] Patent Number: 5,150,299
[45] Date of Patent: Sep. 22, 1992

[54] ANTILOCK WHEEL SPEED CONTROL DEVICE HAVING FIRST AND SECOND BRAKE PRESSURE CONTROLLERS

[75] Inventor: Hideaki Fujioka, Itami, Japan

[73] Assignee: Sumitomo Electric Industries, Ltd., Osaka, Japan

[21] Appl. No.: 576,436

[22] PCT Filed: Jan. 17, 1989

[86] PCT No.: PCT/JP89/00035
 § 371 Date: Sep. 5, 1990
 § 102(e) Date: Sep. 5, 1990

[87] PCT Pub. No.: WO90/08056
 PCT Pub. Date: Jul. 26, 1990

[51] Int. Cl.$^5$ .............................. B60T 8/58
[52] U.S. Cl. .................. 364/426.02; 303/103; 303/110
[58] Field of Search ........... 303/95, 96, 97, 100, 303/102, 103, 106, 107, 110; 364/426.02

[56] References Cited

U.S. PATENT DOCUMENTS

| | | | |
|---|---|---|---|
| Re. 33,486 | 12/1990 | Hirzel et al. | 364/426.02 |
| 4,673,226 | 6/1987 | Every et al. | 364/426.02 X |
| 4,774,667 | 9/1988 | Kuraoka et al. | 364/426.02 |
| 4,825,371 | 4/1989 | Hoashi et al. | 364/426.02 |
| 4,832,415 | 5/1989 | Shinomiya | 364/426.02 X |
| 4,841,446 | 6/1989 | Leiber et al. | 364/426.02 |
| 4,859,002 | 8/1989 | Yoshino | 364/426.02 X |
| 4,862,368 | 8/1989 | Kost et al. | 364/426.02 |
| 4,875,171 | 10/1989 | Fujioka et al. | 364/426.01 X |

Primary Examiner—Parshotam S. Lall
Assistant Examiner—Thomas S. Auchteronie
Attorney, Agent, or Firm—Wenderoth, Lind & Ponack

[57] ABSTRACT

A wheel speed control device in an antilock brake system prevents the wheels of a vehicle such as an automobile from locking while braking. First and second brake pressure controllers are provided in which the first is a conventional differentiation type brake pressure controller and in which the second is an integration type brake pressure controller. Thus, a state such as an excessively low slip speed resulting from insufficient brake pressure, which was difficult to detect with a differentiation type main brake pressure controller, can be detected. This makes it possible to precisely and effectively control wheel speeds by executing minor pressure increase in which the brake pressure is increased at a low rate.

3 Claims, 12 Drawing Sheets

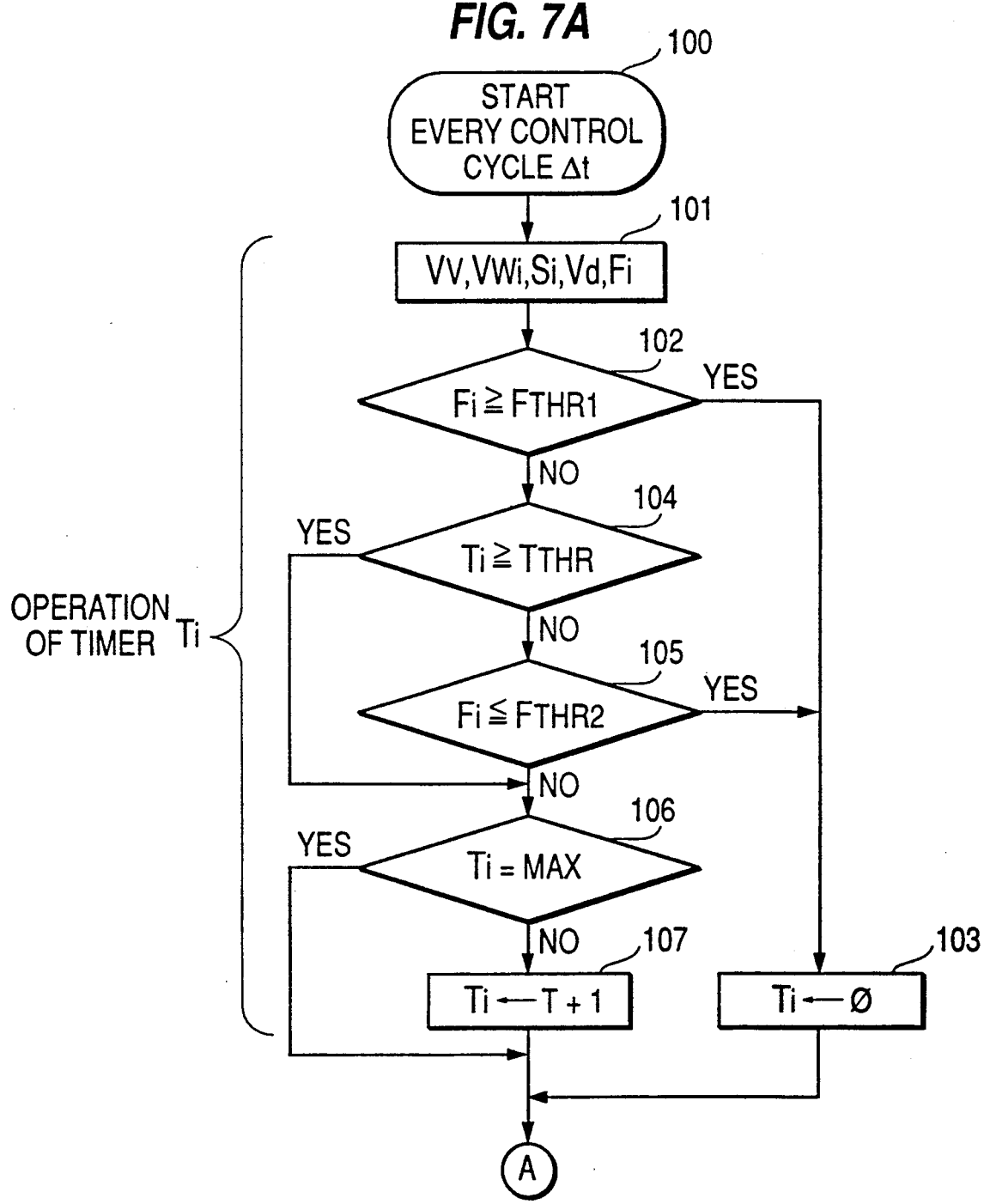

ANTILOCK WHEEL SPEED CONTROL DEVICE HAVING FIRST AND SECOND BRAKE PRESSURE CONTROLLERS

FIELD OF ART

This invention relates to a wheel speed control device in an antilock brake system for preventing the wheels of a vehicle such as an automobile from locking while braking.

BACKGROUND ART

In a prior art antilock brake system, any excessive slip of wheels is detected by comparing the slip speed of each wheel, or a control variable calculated from its differentiated value, with a predetermined threshold value, the wheel speeds are controlled by increasing or reducing the brake pressure based on the result of the comparison, and the brake pressure on any wheel which has recovered from the locking state is increased at a fixed rate irrespective of the behavior of the wheel.

In order to detect a locking tendency of a wheel, it is an effective measure to carry out antilock control by comparing the slip speed, of each wheel or a control variable based on its differentiated value, with a predetermined threshold value as with the aforementioned prior art antilock brake system. But it is difficult to detect an excessively low slip speed resulting from an insufficient braking force when the wheels have recovered from the locking state and the wheel speeds have become substantially equal to the vehicle speed. Namely, during antilock control while the vehicle is moving, the vehicle deceleration is liable to drop below a predetermined value. This not only causes vibrations and pitching of the vehicle body but also leads to an extension of the braking distance.

DISCLOSURE OF THE INVENTION

In accordance with the present invention, there is provided a wheel speed control device comprising a wheel speed calculating means for calculating the speed Vw of each wheel based on the output Vi (i = 1 .... 4) of a wheel speed sensor of each wheel, a vehicle speed calculating means for calculating the vehicle speed Vv, a wheel speed differentiating means for producing a differentiated output Vd of the output Vw of the wheel speed calculating means, a slip speed calculating means for calculating the slip speed Si of each wheel from the output Vw of the wheel speed calculating means and the output Vv of the vehicle speed calculating means, and a brake pressure controller for calculating a control variable from the output Vd of the wheel speed differentiating means and the output Si of the slip speed calculating means and outputting, based on the results of the calculation, a pressure increase, pressure hold or pressure reduction command to a brake pressure control actuator to control the brake pressure on each wheel. The improvement of the invention includes a second brake pressure controller for integrally calculating any excess or shortage of the slip speed after recovering from locking state, based on the output Si of the wheel slip speed calculating means while the control variable calculated by the brake pressure controller satisfies predetermined conditions, and outputting a command to carry out a minor pressure increase having a small rate of pressure increase to the brake pressure control actuator.

With the wheel speed control device of this invention having the above-described structure, by the provision of an integration type brake pressure controller in addition to a conventional main brake pressure controller actuated based mainly on differentiation type judgements, it becomes possible to detect any excessively low slip speed resulting from an insufficient braking force while the wheels are recovering from a locking state during braking, which could not be detected with a differentiation type main brake pressure controller, and to carry out minor pressure increases in which the brake pressure is increased at a low rate. This permits more precise and more effective control of the wheel speeds.

Namely, the integration type brake pressure controller used in the wheel speed control device according to this invention functions as a timer and a counter. It checks at every control cycle $\Delta t$ over a predetermined period $\Delta T$ whether or not the wheel brake pressure is lower than a suitable level by comparing the wheel slip speed Si with a predetermined threshold value $S_{THR}$, if the control variable calculated by the main brake pressure controller meets predetermined conditions. Every time it is judged that the wheel brake pressure is lower than the suitable level, i.e. $Si < S_{THR}$, it will decrement the content (CTR) of the counter by one count and every time it is judged that the brake pressure is at the suitable level, i.e. $S_{THR} \leq Si$, the content (CTR) of the counter is incremented by one count. Supposing that $\Delta T = n \times \Delta t$ (n indicates a positive integer), the sign of CTR (content of the counter) is checked when the counter is operated (added and subtracted) n times to judge whether or not to carry out a minor increase in the brake pressure. In this case, if $0 \leq CTR$, the integration type, brake pressure controller does not give a minor pressure increase command (to hold the pressure). If $CTR < 0$, it gives such a command to the brake pressure control actuator.

With the wheel speed control device for an antilock brake system according to this invention, the main brake pressure controller detects, judges and controls for any unstable transient behavoirs of the wheels (such as when the wheels are showing a tendency to lock or to recover from locking state), mainly by use of control variables calculated from the differentiated values Vd of the wheel speeds. On the other hand, the integration type brake pressure controller detects, based on the slip speed Si, the states where the brake pressure is insufficient when the wheels have recovered from a locking state and the wheel speeds Vw become sufficiently close to the vehicle speed Vv, which the main brake pressure controller can not detect. If it is judged that the brake pressure is insufficient, the above-described minor pressure increase having a low pressure increase rate is carried out. Thus, the wheel speeds can be controlled precisely and reliably. Such a minor pressure increase is the first feature of the present invention. With this arrangement, the wheels can be prevented from locking, the vehicle body can be prevented from vibrating and pitching and the braking distance can be shortened. The duration of the minor pressure increase may be fixed or may be corrected at intervals of a predetermined time $\Delta T$.

However, if the duration of the minor pressure increase is fixed, the following problems will arise.

a) If, for example, the friction coefficient of a road surface should change sharply from low to high, it is impossible to increase the pressure correspondingly. Thus, the vehicle deceleration will fall short.

b) Even if slower pressure increase is desired, for example, if the slip speeds grow so large that the level of pressure increase can be kept small, the slip speeds can be kept within an optimum range for a longer period of time by carrying out a minor pressure increase at a lower rate. If the duration of the minor pressure increase is fixed, the wheels tend to show another sign of locking quickly. This will result in a significant disadvantage from the viewpoint of ride comfort and braking distance.

With the wheel speed control device according to this invention, if judged that it is necessary to execute the minor pressure increase, i.e. if the content CTR of the counter is less than 0, the time $t_A$ of minor pressure increase is determined by correcting a reference time $t_B$ of minor pressure increase or the time of the preceding minor pressure increase. Thus, pressure can be increased so as to comply with the ever-changing friction coefficient of a road surface. This will make it possible to keep the vehicle deceleration as large as possible while preventing the appearance of a locking tendency. The correction of the time $t_A$ is made in such a way that it is extended if the slip speeds are lower (the brake pressure is insufficient) when making a judgement on whether or not to carry out minor pressure increase and is shortened if they are higher.

It is the second feature or function of the present invention to determine the duration of pressure increase by correcting the duration of the preceding minor pressure increase, as described above.

With the wheel speed control device of this invention, if it is determined to execute minor pressure increase, i.e. if the content CTR of the counter is CTR<0, the time $t_A$ of minor pressure increase is determined by correcting it by learning according to the number of times N of executions of minor pressure increase in the preceding skid cycle (one cycle from when a wheel locking tendency is detected to when a judgement for pressure reduction is made). Thus, any bad influence on controllability resulting from variations in the performance of hydraulic control units and variations in the loads on the vehicle can be prevented and the time of minor pressure increase can be determined so as to match any brake pressure control actuators mounted on the vehicle. Thus, pressure can be increased in a more suitable manner. This makes it possible to keep the vehicle deceleration as high as possible while preventing the wheels from showing a locking tendency and the body from vibrating.

It is the third feature or function of the present invention to correct by learning the time of the pressure increase according to the number of times of the minor pressure increase executed in the previous skid cycle, as described above.

Supposing that the reference time of minor pressure increase is $t_B$, the unit correction time is $\Delta t_M$, and the learning correction time $t_M$=learning correction time $t_M$ in the preceding skid cycle+correction time $K \cdot \Delta t_M$, because $t_A = t_B + t_M$, the time of pressure increase $t_A$ is obtained by correcting $t_B$ by the learning correction time $t_M$.

If the friction coefficient ($\mu$) of the road surface increases sharply beyond a predetermined range of fluctuation, e.g. if the vehicle runs suddenly onto a less slippery asphalted road from a slippery snow-covered road, it was difficult to cope with such a situation. Namely, because the optimum brake pressure while the vehicle is on an asphalted road is far larger than the one while on a snow-covered road, if the friction coefficient of the road surface increases sharply, the vehicle deceleration will not increase quickly. Thus, the braking distance tends to be long because the friction coefficient of the road surface cannot be utilized efficiently.

According to the present invention, if the friction coefficient increases sharply beyond a predetermined range of fluctuation, this is detected based on the behavior of the wheels and a minor pressure increase is executed to cope with such a sharp increase. This makes it possible to increase the brake pressure quickly. Thus, if the vehicle runs suddenly onto a less slippery asphalted road from a slippery snow-covered road, there will be no shortage of vehicle deceleration and the braking distance can be kept to a minimum.

It is the fourth feature or function of the present invention to carry out a minor pressure increase according to fluctuations in the friction coefficient of the road surface, as described above.

Another problem is that if antilock control is executed while the vehicle is travelling on a rough road, the brake pressure might be reduced even if the wheels are merely showing a false locking tendency which disappears spontaneously. This will prevent the vehicle deceleration from rising to a level which can be otherwise reached. Thus, the braking distance tends to extend.

According to the present invention, if the output of an acceleration detector for detecting the vertical acceleration of the vehicle exceeds a predetermined threshold value, it is judged that the vehicle is travelling on a rough road. Based on this judgement, minor pressure increase for correction while on a rough road is carried out separately from the above-described minor pressure increase and irrespective of the above-described differentiation or integration type judgement to re-increase the brake pressure quickly. This makes it possible to keep the braking distance to a minimum while preventing the wheels from locking. Such minor pressure increase for correction while on a rough road should last longer and should be carried out more frequently than the normal minor pressure increase carried out based on the abovementioned integration type judgement.

It is the fifth feature or function of the present invention to carry out the minor pressure increase for correction while the vehicle is on a rough surface, as described above.

BRIEF DESCRIPTION OF THE DRAWINGS

FIGS. 7A to 15 are flow charts of programs for embodying the wheel speed control device according to the present invention by use of a microcomputer.

FIG. 7A and 7B constitute a flow chart of the whole device; FIG. 10 is a partial flow chart of the device having the first function; FIG. 11 is a similar view of the device having the second function; FIGS. 12 and 15 are similar views of the device having the third function, FIGS. 8 and 13 are similar views of the device having the fourth function; and FIGS. 9 to 14 are similar views of the device having the fifth function.

BEST MODE FOR EMBODYING THE INVENTION

The embodiments of the wheel speed control device according to this invention will be now described with reference to the accompanying drawings.

Figure 1:
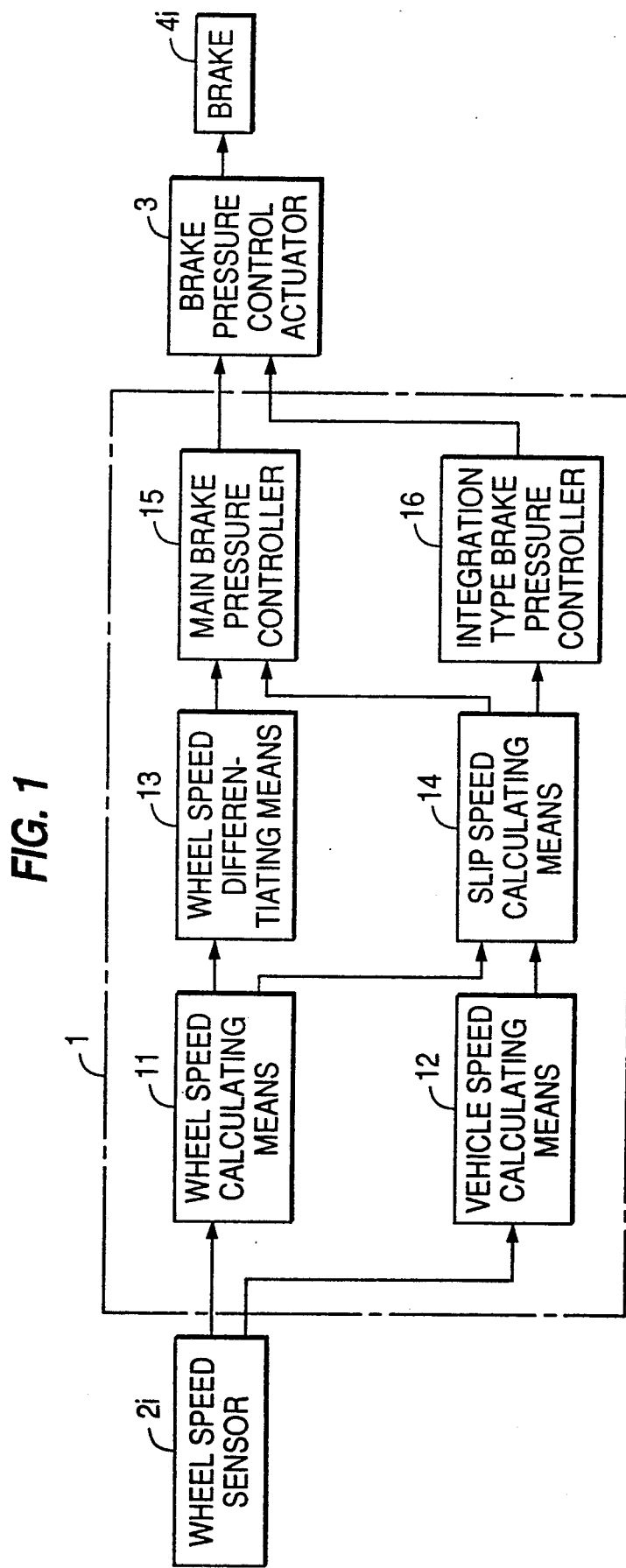
FIGS. 1 and 6 are block diagrams of the embodiments of the wheel speed control device according to the present invention.

FIG. 1 shows the structure of the first embodiment of the wheel speed control device according to this invention. The wheel speed control device 1 comprises a wheel speed calculating means 11 for calculating the speed Vw of each wheel based on the outputs Vi (i =1 ...4) of wheel speed sensors 2i, a vehicle speed calculating means 12 for calculating the vehicle speed Vv based on the outputs Vi of the wheel speed sensors 2i, a wheel speed differentiating means 13 for producing the differentiated outputs Vd of the wheel speeds Vw, a slip speed calculating means 14 for calculating the slip speeds $Si(=Vv-Vw)$ from the wheel speeds Vw and the vehicle speed Vv, a main brake pressure controller 15 for calculating a predetermined control variable from the outputs Vd of the wheel speed differentiating means and the slip speeds Si to output, based on the result of the calculation, a command to increase, hold or reduce the brake pressure to a brake pressure control actuator 3 such as solenoid valves (including actuating circuits), and an integration type brake pressure controller 16 for calculating integrally any excess or shortage of the slip speed after recovery from locking, based on the wheel slip speeds Si to output, based on the result of the calculation, a command to execute a minor pressure increase having a low rate of pressure to the brake pressure control actuator 3. The brake pressure control actuator 3 carries out the pressure increase, hold, reduction or minor pressure increase of the brake pressure on the brakes 4i of the wheels, based on the result of judgement by the main brake pressure controller 15 and the integration type brake pressure controller 16 in the brake pressure control device 1. The integration type brake pressure controller 16 has the functions of a timer and a counter.

Figure 2:
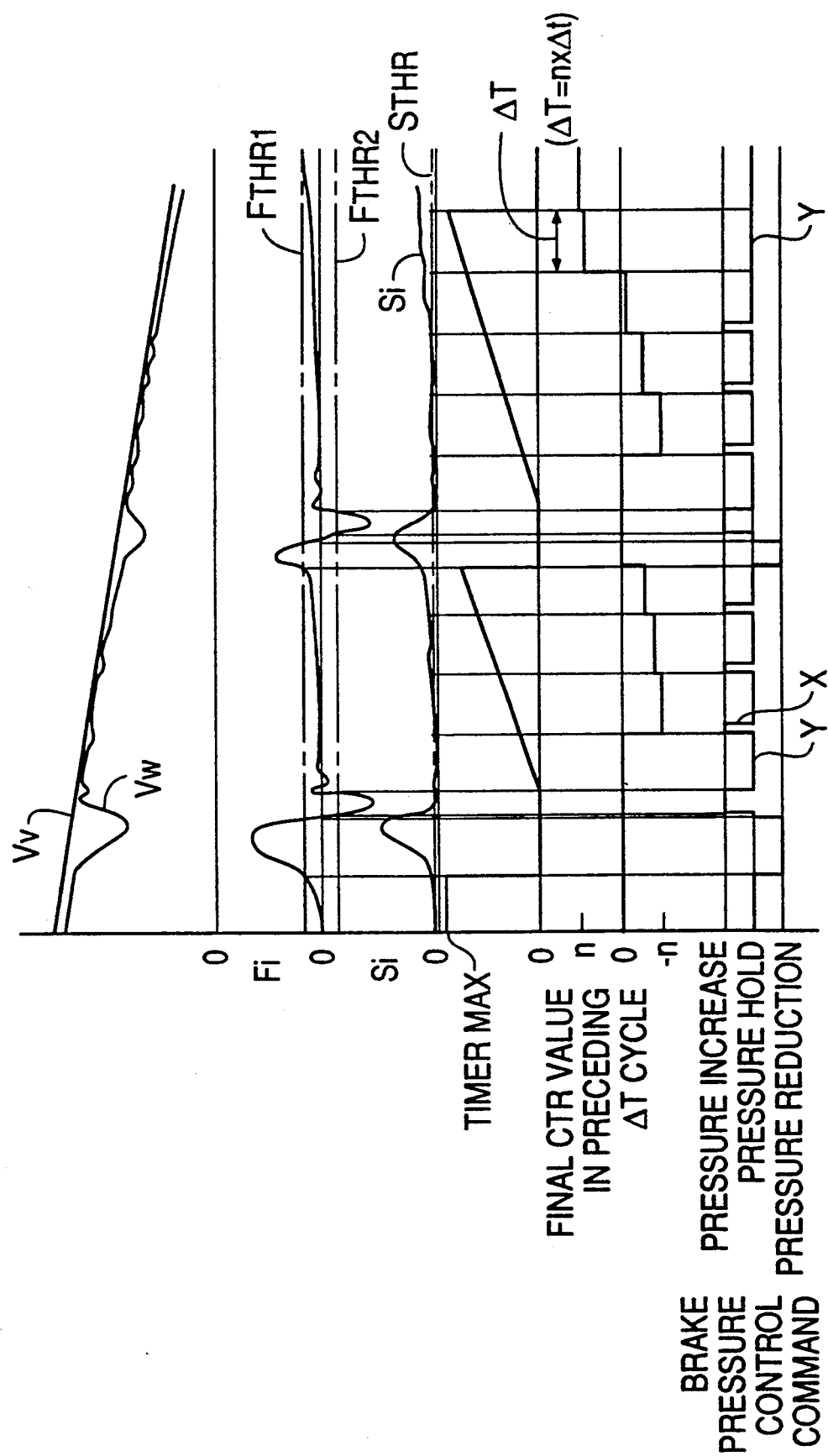
FIGS. 2 to 5 are graphs for describing the operation thereof.

The operation of the wheel speed control device 1 of this embodiment will now be described with reference to FIG. 2.

After the brakes are actuated, if the main brake pressure controller 15 detects any locking tendency of a wheel from the control variable Fi calculated based on the slip speed Si and the differentiated value Vd of the wheel speed, a pressure reduction command is given to the brake pressure control actuator 3 and then pressure hold and pressure increase commands are given. As a result, the vehicle speed Vw will become close to the vehicle speed Vv and the wheel will show signs of recovery from a locking state. The main brake pressure controller 15 detects such signs of locking or recovery from a locking state by comparing the control variable Fi (given by Fi =Si +Vd) with its threshold values $F_{THR1}$ and $F_{THR2}$ ($F_{THR2}<F_{THR1}$). However, the control variable does not have to be calculated exclusively by the above formula but may be calculated by use of another suitable function.

While the control variable Fi is under certain conditions, e.g. if it shifts from the level smaller than $F_{THR2}$ to the range $F_{THR2} \leq =Fi \leq F_{THR1}$ and are kept in this range, the integration type brake pressure controller 16 will be activated (its timer and counter functions activated) the moment such conditions are met (for example, the moment the Fi value shifts from the level larger than $F_{THR1}$ to the above range or the moment the Fi value shifts from the level smaller than $E_{THR2}$ to the above range) based on the judgement that the slip speed may be too low due to insufficient brake pressure. In the integration type brake pressure controller 16, the control cycle $\Delta t$ it is used as a unit period to compare the slip speed Si with a predetermined threshold value STHR at intervals of control cycle $\Delta t$. If $Si<S_{THR}$, the content CTR of the counter is decremented. If $S_{THR} \leq Si$, it is incremented. The sign of the content CTR of the counter is checked at intervals of predetermined period $\Delta T$ given by $\Delta T = n \Delta t$ (n is a positive integer) (i.e. every time the counter performs additions and subtractions n times) to judge whether to execute a minor pressure increase having a low pressure increase rate. In this case, if $0 \leq CTR$, the integration type brake pressure controller 16 outputs a command to hold the brake pressure (designated by Y in FIG. 2). If $CTR<0$, it outputs a minor pressure increase command (X in FIG. 2) to the brake pressure control actuator 3. Thus, any shortage of slip speed due to insufficient brake pressure while the wheel is recovering from locking state can be compensated quickly by the timely execution of minor pressure increase by use of the integration type brake pressure controller 16.

Figure 3:
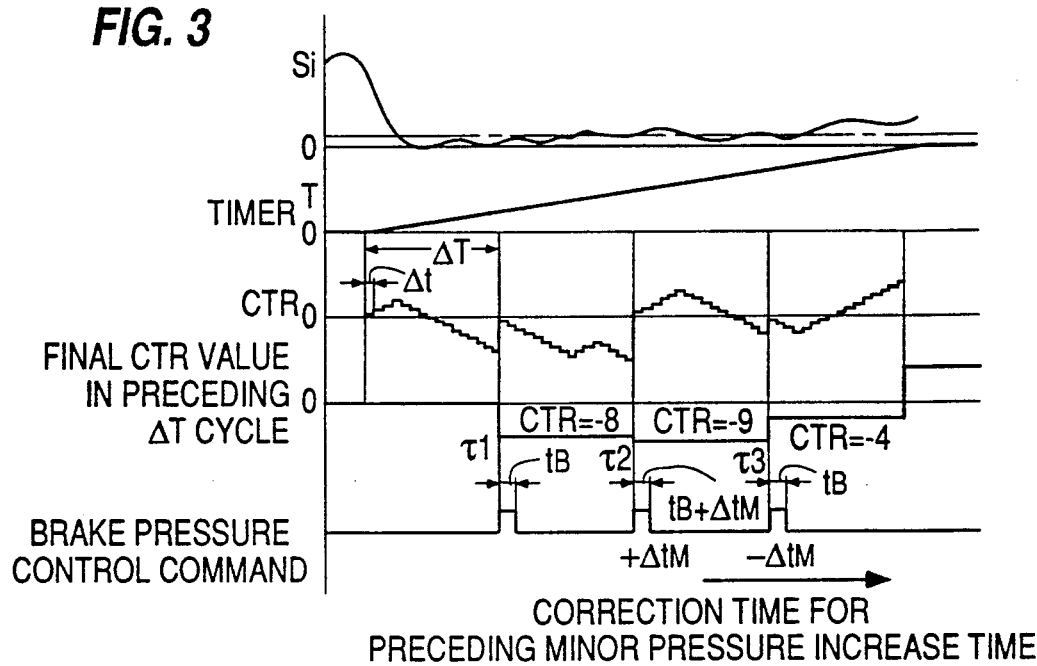

According to the second feature of the present invention, when executing such a minor pressure increase, its time $t_A$ is determined by correcting the time of the previous minor pressure increase or the reference time $t_B$ of minor pressure increase. For example, since $CTR<0$ at the time $\tau_1$ in FIG. 3, minor pressure increase is carried out. Since the judgement of this minor pressure increase is the judgement in the first $\Delta t$ section of the skid cycle shown (the period between the time when the locking tendency of the wheel is detected and a pressure reduction judgement is made and the time when the next pressure reduction judgement is made), the time of the preceding minor pressure increase is zero ($t_A=0$). Thus, time of pressure increase is set to the reference time of minor pressure increase ($t_A=t_B$) Otherwise, in the initial judgement of minor pressure increase, the time of pressure increase may be determined as $t_A=t_B+\Delta t_M$ (wherein $\Delta t_M$ is a reference correction time).

At the end $\tau_2$ of the next $\Delta T$ section, the content CTR of the counter at that time is compared with the CTR value at the time of the preceding minor pressure increase, i.e. at the end $\tau_1$ of the previous $\Delta T$ section. The time $t_A$ of pressure increase is set to a value shorter or longer by the period $\Delta t_M$ than the time (tA =tB) of the preceding ($\tau_1$) minor pressure increase, depending on whether the current CTR value is larger than the preceding CTR value (which means that the slip speed Si is getting closer to an optimum value) or smaller (which means that the slip speed Si is getting away from the optimum value). Namely, at the time $\tau_2$ in FIG. 3, since former CTR ($-8$) >current CTR value ($-9$), the time of minor pressure increase $t_A=t_B+\Delta t_M$. Also, at the end $\tau_3$ of $\Delta T$ section, since previous CTR ($-9$) >current CTR ($-4$), $t_A=(t_B+\Delta t_M)-\Delta t_M=t_B$. As described above, in executing timely minor pressure increase to eliminate shortage of slip speed owing to insufficient brake pressure in the course of recovery from locked state, the time $t_A$ of pressure increase is determined according to the behavior of the wheels. Namely, by increasing the brake pressure appropriately according to the ever-changing friction coefficient of the road surface, premature locking due to an excessive increase in pressure and shortage of deceleration due to insufficient brake pressure can be prevented.

According to the third feature of the present invention, in judging the execution of minor pressure increase, the integration type brake pressure controller 16 determines the time $t_A$ of minor pressure increase by correcting by learning according to the number of times N of executions of minor pressure increase in the preceding skid cycle In this embodiment, the time $t_A$ of pressure increase is determined by correcting the coefficient k in the aforementioned formula $t_A = t_B + t_M$ and $t_M$ = preceding $t_M$ value + k·$\Delta t_M$ based on the following table (hereinafter referred to as "learning correction table") according to the number of times N of executions of minor pressure increase in the preceding skid cycle. Such a learning correction table is preset according to the performance characteristics of the vehicle-mounted brake pressure control actuator 3. In this table, the k value is set to ±0 if 7≦N so that the control device will give a judgement that minor pressure increase was executed so many times in the preceding skid cycle not because of variations in performance on the part of the brake pressure control actuator but because of external disturbances e.g. because the vehicle has suddenly run onto a less slippery asphalted road from a slippery snow-covered road surface while antilock control is being activated, and thus no correction of pressure increase time is necessary. With this arrangement an incorrect correction based on misjudgement can be prevented.

| N | K |
|---|---|
| 0 | ±0 |
| 1, 2 | −1 |
| 3, 4 | ±0 |
| 5 | +1 |
| 6 | +2 |
| 7 or above | ±0 |

Figure 4:
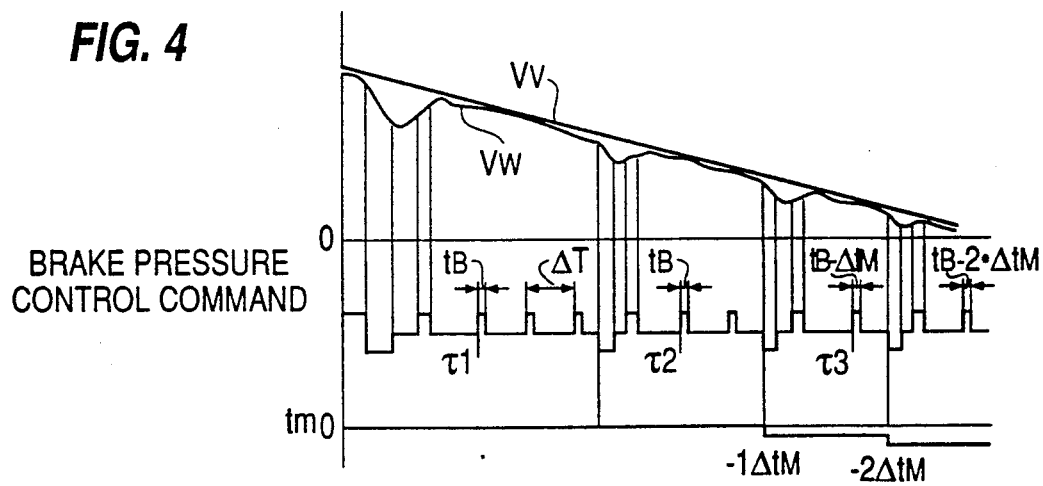

In carrying out such minor pressure increase, its time $t_A$ is determined by calculating, based on the learning correction table, the coefficient k in the aforementioned formulas $t_A = t_B + t_M$ and $t_M$ = preceding $t_M$ value + k $\Delta t_M$ according to the number of times N of executions in the preceding skid cycle. For example, at the time $\tau_1$ in FIG. 4, minor pressure increase is executed because CTR < 0. Since this moment of time is within the first skid cycle after antilock control has started, there are no data on the number of times N of executions of minor pressure increase in the preceding skid cycle. Thus, the time $t_A$ of minor pressure increase is set to the reference time $t_B$ of minor pressure increase and in this skid cycle, minor pressure increase is executed three times each for the abovedescribed period of time.

At the time $\tau_2$ in the next skid cycle, since the number of times N of executions of minor pressure increase is 3, the k value is set to k = 0 based on the learning correction table and thus the time $t_A$ of minor pressure increase is set to the same value as in the preceding skid cycle, i.e. $t_A = t_B$. Minor pressure increase is executed twice each for the reference time $t_B$. Further, at the time $\tau_3$ in the next skid cycle, minor pressure increase is carried out. Since the number of times of executions of minor pressure increase in the preceding skid cycle is given by N = 2, the time of minor pressure increase is determined as k = −1, i.e. $t_M = −\Delta t_M$ and $t_A = t_B + t_M = t_B − t_M$. Minor pressure increase is carried out once. Similarly, in the next skid cycle, minor pressure increase is carried out with the $t_A$ value set to $t_A = t_B + t_M = t_B − 2·\Delta t_M$ because $t_M$ = preceding $t_M$ value $− \Delta t_M = −2 ·\Delta T_M$.

As described above, in executing timely minor pressure increase in order to eliminate a shortage of slip speed due to insufficient brake pressure while the wheel is recovering from locking state, its time $t_A$ is determined by learning correction according to the number of times of executions of minor pressure increase in the preceding skid cycle. Namely, by correcting minor pressure increase so as to comply with the performance of each vehicle-mounted specific brake pressure control actuator, it becomes possible to prevent the braking distance from increasing due to a delay in pressure increase because of variations in performance and loads on both sides of the vehicle and to prevent vibrations of the vehicle which take place if the range of pressure is too large.

Figure 5:
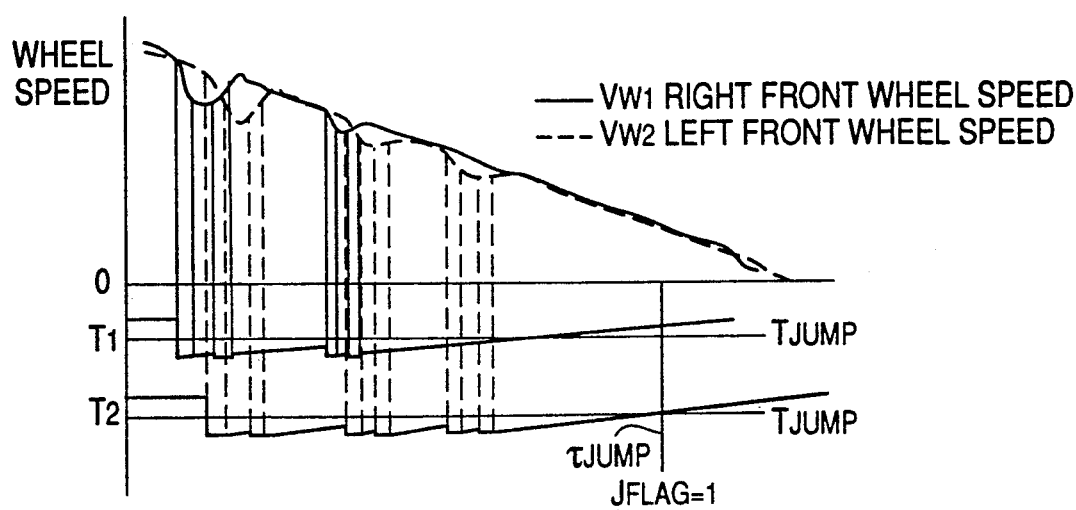

With the integration type brake pressure controller 16 having the fourth function of the present invention, if it is judged that the brake pressures on the right and left front wheels are not reduced over a predetermined time $T_{JUMP}$ as a threshold value for the fluctuation judgement of the friction coefficient, based on the comparison of the control variables F1 and F2 of the right and left front wheels with the first threshold value $F_{THR1}$ for the judgement of pressure reduction, it is judged that the friction coefficient of the road surface has increased sharply beyond a predetermined range of fluctuation, e. g. due to the fact that the vehicle has run onto a less slippery asphalted road surface from a slippery snow-covered road surface. Thus, a command to execute minor pressure increase for correcting fluctuations in the friction coefficient is given separately from the above-described minor pressure increase. Namely, for example in FIG. 5, when both the contents T1 and T2 of timers for counting the time after the pressure reductions of the right front wheel and the left front wheel have ended exceed at a time $\tau_{JUMP}$ the threshold value $T_{JUMP}$ for the judgement of fluctuations in the friction coefficient, a command to execute minor pressure increase for correcting fluctuations in the friction coefficient is given. This minor pressure increase is carried out at intervals of $\Delta T$. Its time $t_A$ is determined by correcting the reference time $t_B$ of minor pressure increase.

Figure 6:
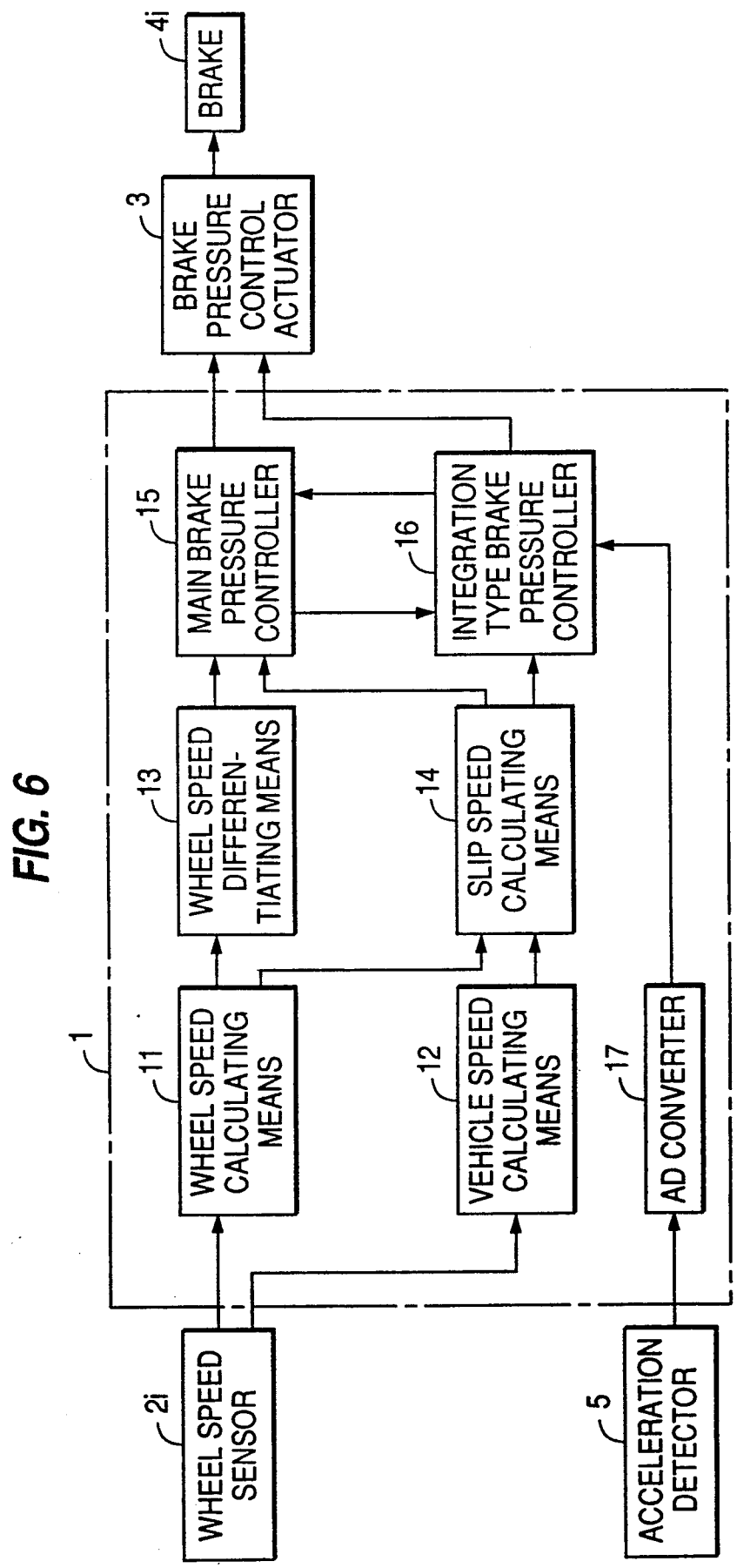

In order to add the fifth feature of the present invention, the control device should have a circuit arrangement as shown in FIG. 6 and be provided with an analog-digital (AD) convertor 17 for converting the output (analog quantity) of the acceleration detector 5 for detecting the vertical acceleration of the vehicle into digital data and supplying them to the integration type brake pressure controller 16. The acceleration detector or sensor 5 may be a dynamic electric type, piezoelectric type, capacitance type or strain gauge type or any other type such as one which utilizes the supersonic Doppler measuring method. The output of the acceleration sensor 5 should be filtered to weaken it.

The integration type brake pressure controller 16 calculates a rough road index K at intervals of control cycles $\Delta t$ based on the vertical acceleration A of the vehicle which is inputted from the acceleration detector 5 through the AD convertor 17. The index K is compared with a predetermined threshold value $A_{THR}$ for detecting a rough road. If the rough road index K exceeds the threshold value $A_{THR}$ while the wheel speed control device 1 is operating in the above-described manner based on the differentiation type judgement and the integration type one during antilock control, command for minor pressure increase which is longer in duration than the ordinary minor pressure increase are issued more frequently (for example, at intervals of a multiple of ΔT). As a result, even if the brake pressure is reduced as a result of a false locking tendency during antilock control while the vehicle is running on a rough road, since pressure can be re-increased swiftly, it is possible to effectively obviate a problem that the wheel deceleration will not increase to an inherently attainable level and thus the braking distance increase.

Figure 7B:
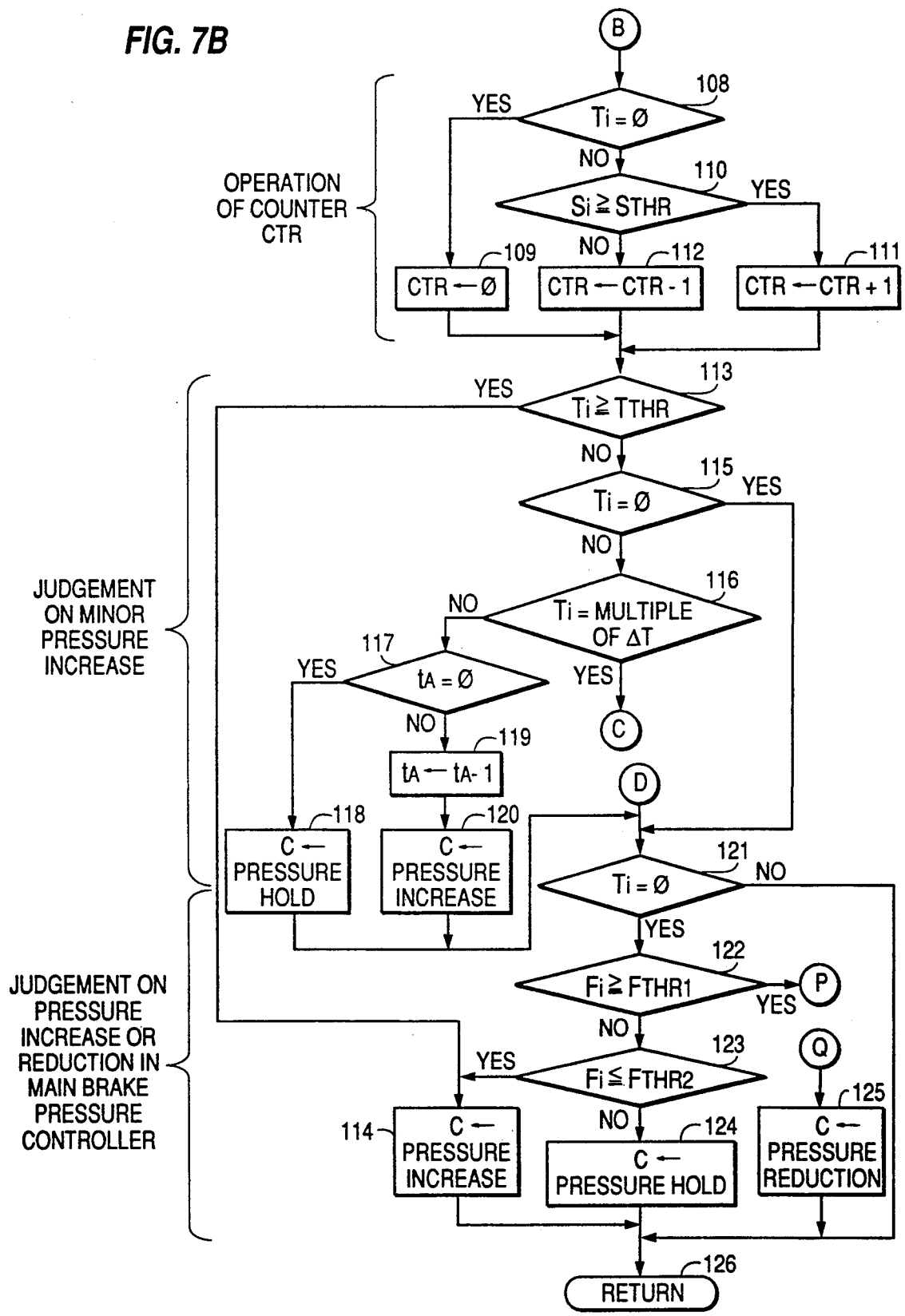

The control by the wheel speed control device 1 can be done by use of a microcomputer containing a program represented by the flow chart shown in FIG. 7. This will be described below.

Every time each control cycle Δt starts (Step 100), the microcomputer calculates the vehicle speed Vv, the wheel speeds Vwi, the wheel slip speeds Si, the differentiated values Vdi of the wheel speeds, control variables Fi (for example, Fi = Si + Vdi) (Step 101). In step 102, the control variables Fi are compared with the first threshold value $F_{THR1}$ for the judgement of pressure reduction. If $F_{THR1} \leq Fi$, the timer is reset (Step 103). In Step 108, judgement is made on whether or not the timer is reset. In Step 102, unless $F_{THR1} \leq Fi$, the content Ti of the timer is compared with a threshold value $T_{THR}$ for judging whether the antilock control has ended (Step 104). If $T_{THR} \leq Ti$, it is judged whether or not the Ti value has reached its maximum (Step 106).

If not $T_{THR} \leq Ti$ in step 104, i.e. if the antilock control is in operation, the control variables $F_i$ are compared with its second threshold value $F_{THR2}$ for pressure increase judgement to judge whether or not $Fi \leq F_{THR2}$ (Step 105). If $Fi \leq F_{THR2}$, the timer is reset (Step 103). The program proceeds to Step 108. If not $Fi \leq F_{THR2}$ in Step 105, it is judged whether or not the content Ti of the timer has reached its maximum (Step 106). If the Ti value has reached its maximum, the program proceeds directly to Step 108. If it has not, the program proceeds to Step 108 after adding one time count (every time Δt) to the Ti value in Step 107. The above-described operations represent the timer function of the integration type brake pressure controller in the microcomputer-operated wheel speed control device according to the present invention.

In order to perform the first, second and third functions, the program proceeds directly to Step 108.

Figure 8:
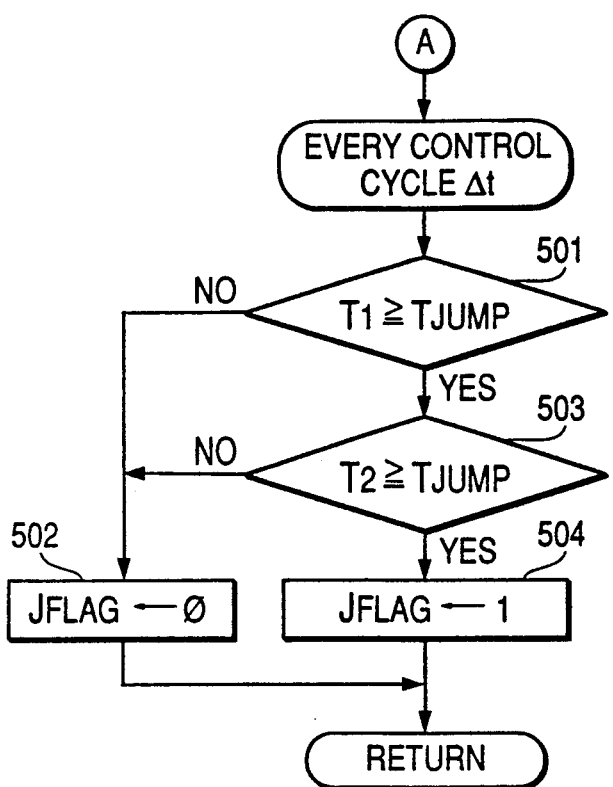

In order to perform the fourth function, the program passes through an entrance A to an exit B shown in FIG. 8 when proceeding to step 108 through Step 103 and Step 106 or 107.

Figure 9:
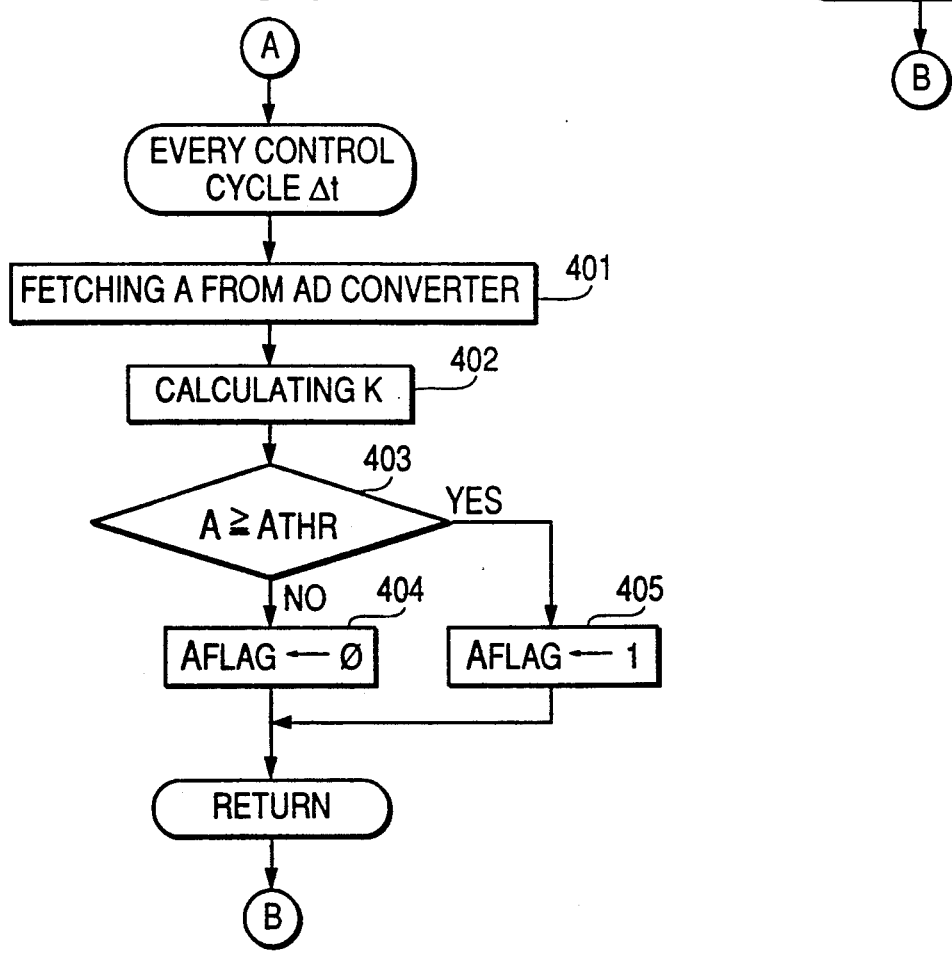

If the fifth function is added, the program passes through an entrance A and then an exit B shown in FIG. 9 when proceeding to Step 108 through Step 103 and Step 106 or 107.

If the device has the fourth function, in the Steps shown in FIG. 8, the content Ti of a timer for counting at intervals of control cycle Δt the time elapsed after a pressure reduction of the front right wheel has ended (a timer for the front right wheel) is compared with the threshold value $T_{JUMP}$ for the judgement of fluctuations in the friction coefficient (Step 501). If not $T_{JUMP} \leq T_1$, a flag $J_{FLAG}$ for indicating that the friction coefficient of the road surface has increased sharply beyond a predetermined range of fluctuation is set to zero, which commands execution of the ordinary minor pressure increase (Step 502). Then the program returns to an entrance B shown in FIG. 7. If $T_{JUMP} \leq T_1$ in Step 501, the content T2 of a timer for the front left wheel is compared with the $T_{JUMP}$ value to check whether or not $T_{JUMP} \leq T2$. If $T_{JUMP} \leq T2$, the flag $J_{FLAG}$ is set to 1 (Step 504), which commands execution of minor pressure increase for correcting fluctuations in the friction coefficient. The program then returns to the entrance B in FIG. 7. If $T2 < T_{JUMP}$ in Step 503, after setting the flag $J_{FLAG}$ to zero (Step 502), the program returns to the entrance B in FIG. 7.

With the device having the fifth function, in the steps shown in FIG. 9, the rough road index K is calculated (Step 402) by taking in the vertical acceleration A of the vehicle from the AD convertor 17 at intervals of control cycle Δt (Step 401). The K value may be the value obtained by taking a time-average of the absolute value of the acceleration A, that is the value given by the formula $$K = \frac{1}{\tau} \int_0^\tau |A| dt.$$

In Step 403, the rough road index K is compared with the predetermined threshold value $A_{THR}$ for detecting a rough road. If not $A_{THR} \leq K$, a rough road flag $A_{FLAG}$ which indicates whether or not the vehicle is running on a rough road is set to zero (Step 404), which indicates that no rough road condition is detected. The program then returns to the entrance B in FIG. 7. If $A_{THR} \leq K$, the rough road flag $A_{FLAG}$ is set to 1 (Step 405), which indicates that a rough road condition has been detected. The program then returns to the entrance B in FIG. 7.

Next, in Step 108, it is judged whether or not the timer is reset, i.e. whether or not Ti=0. If it is reset, the counter is reset (its content CTR=0) in Step 109. Then the program proceeds to Step 113 to judge whether or not $T_{THR} \leq Ti$. If not Ti=0 in Step 108, the Si values are compared with their predetermined threshold value $S_{THR}$ in Step 110. If $S_{THR} \leq Si$ at that time, the counter is incremented (one count is added to the content CTR; Step 111). If $Si < S_{THR}$, the counter is decremented (one count is subtracted from the content CTR; Step 112). Then the program proceeds to Step 113. The above-described steps represent the counter function of the integration type brake pressure controller in the microcomputer-operated wheel speed control device according to this invention.

Figure 10:
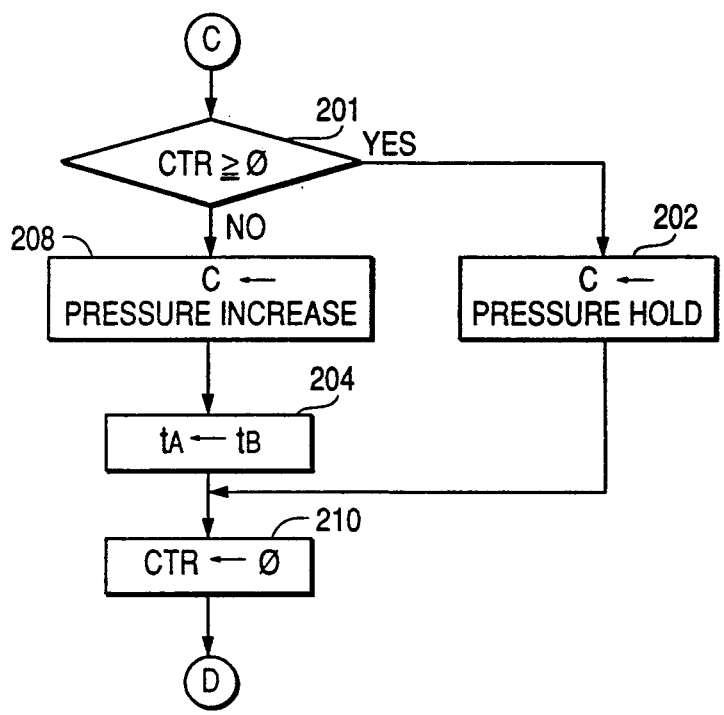

The microcomputer judges whether or not $T_{THR} \leq Ti$ in Step 113. If $T_{THR} \leq Ti$, judgement is given that the antilock control has finished and an ordinary pressure increase command is given in Step 114 (a brake pressure control command C is set to pressure increase). If $Ti < T_{THR}$ in Step 113, it is further judged whether or not Ti=0 (Step 115). If Ti=0, the program proceeds through Step 121 to Step 122. If not Ti=0 in Step 115, it is judged if the Ti value is equal to a multiple of ΔT. If it is and if the pressure increase time is fixed, i.e. the device has the first function, the program proceeds to a routine between an entrance C and an exit D in FIG. 10.

In this routine, it is judged in Step 20 whether or not $0 \leq CTR$ (content of the counter). If $0 \leq CTR$, the brake pressure control command C is set to pressure hold (Step 202) and the counter is reset (Step 210).

If CTR<0 in Step 201, the brake pressure control command C is set to pressure increase in step 208, the time $t_A$ of pressure increase (the time of minor pressure increase) to a reference time of minor pressure increase $t_B$ (Step 204) and the counter is reset (Step 210). The program then proceeds to Step 121.

With the device having the second function, it is judged in Step 116 whether or not the T value is equal to a multiple of $\Delta T$. If it is, the program proceeds to a routine between an entrance C and an exit D shown in FIG. 11.

Figure 11:
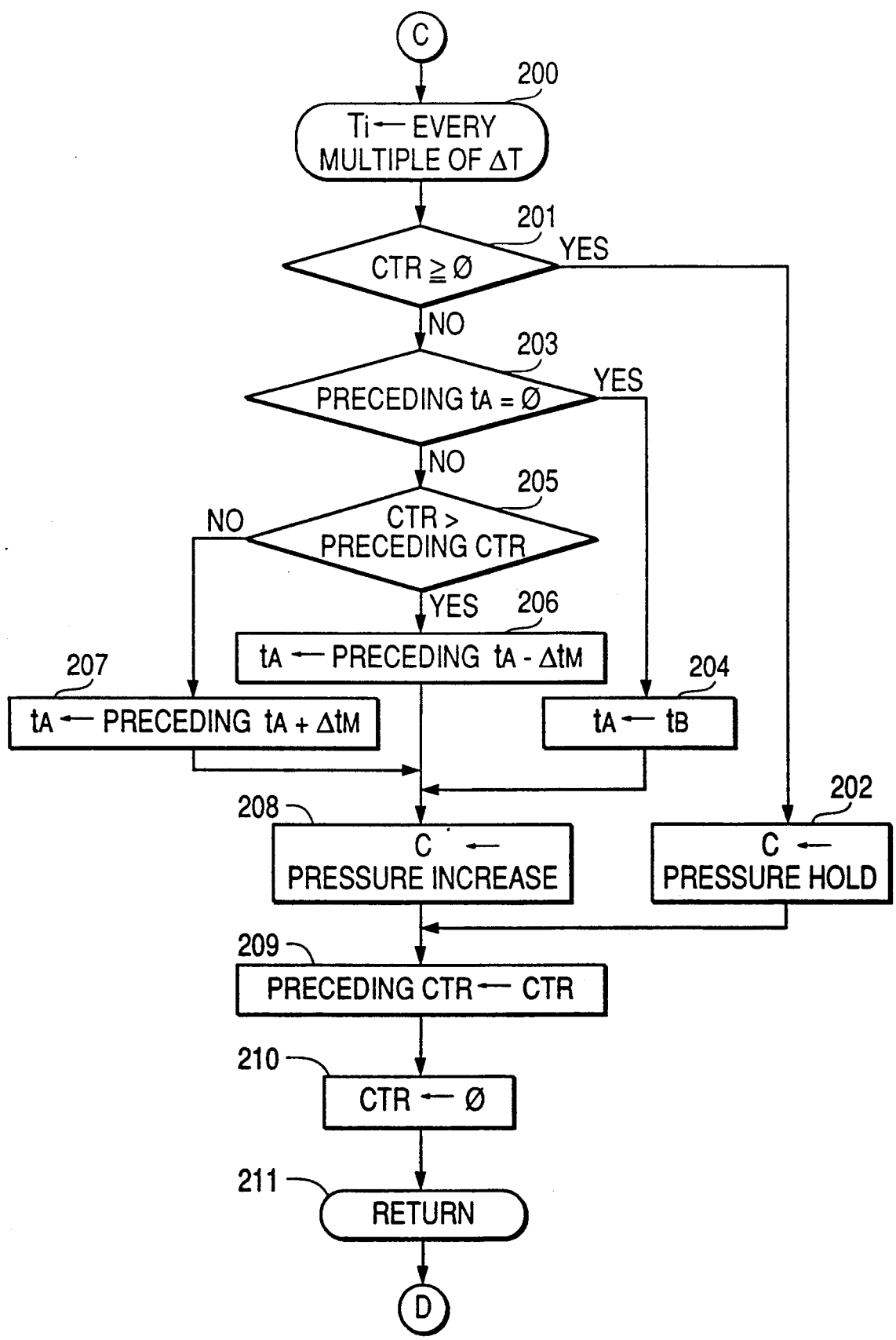

In FIG. 11, every time the content T of the timer gets equal to a multiple of $\Delta T$ (Step 200), the sign of the content CTR of the counter is checked in Step 201. If $0 \leq CTR$, a pressure hold command is given (Step 202). No minor pressure increase is carried out in this state. If not $0 \leq CTR$, it is judged in Step 203 whether or not the time $t_A$ of the preceding minor pressure increase was zero. If it was, the $t_A$ value is set to the reference time $t_B$ of minor pressure increase (Step 204) and in Step 208 the brake pressure control command C is set to pressure increase (execution of minor pressure increase). If not, the current CTR value is compared with the CTR value at the preceding minor pressure increase (Step 205). If the former is larger than the latter, the time $t_A$ of pressure increase is set to a value shorter than the time of the preceding minor pressure increase by a reference correcting time $\Delta t_M$ (Step 206). Then pressure increase is executed in Step 208. If the current CTR value is equal to or smaller than the preceding CTR value in Step 205, the time $t_A$ is set to a value longer than the time of the preceding minor pressure increase by the reference correcting time $\Delta t_M$ (Step 207). Then pressure increase is executed in Step 208. After the brake pressure control command C has been set to pressure hold or pressure increase in Step 202 or 208, the CTR value at the judgement of the preceding minor pressure increase is renewed according to the CTR value at the time of judgement of the current minor pressure increase (Step 209) and the counter is reset (Step 210). The program then returns to the entrance D in FIG. 7 (Step 211).

Figure 12:
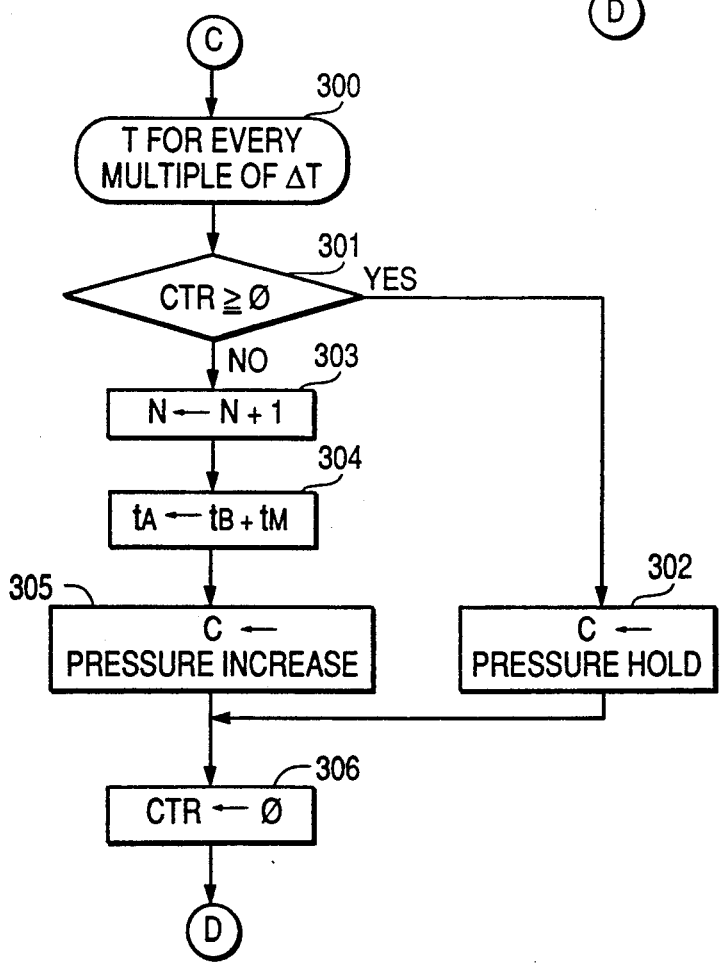

With the device having the third function, as shown in FIG. 12, every time the content T of the timer gets equal to multiple of $\Delta T$ ($\Delta T = n \, \Delta t$) (Step 300), the sign of the content CTR of the counter is checked in Step 301. If $0 \leq CTR$, a pressure hold command is given (Step 302). Namely, no minor pressure increase is executed. If not $0 \leq CTR$, the number of times N of executions of minor pressure increase is set to the previous number of times N+1 (Step 303), the time $t_A$ of minor pressure increase is set to the sum of the reference time $t_B$ of minor pressure increase and the learned correction time $t_M$ in step 304, and in Step 305, the minor pressure increase is carried out for the thus determined period $t_A$. The learning correction time $t_M$ is the sum of the $t_M$ value in the preceding cycle and the correction time $k \cdot t_M$. After pressure hold in Step 302 or pressure increase in Step 305 has been executed, the counter is reset (Step 306) and the program returns to the entrance D in FIG. 7.

Figure 13:
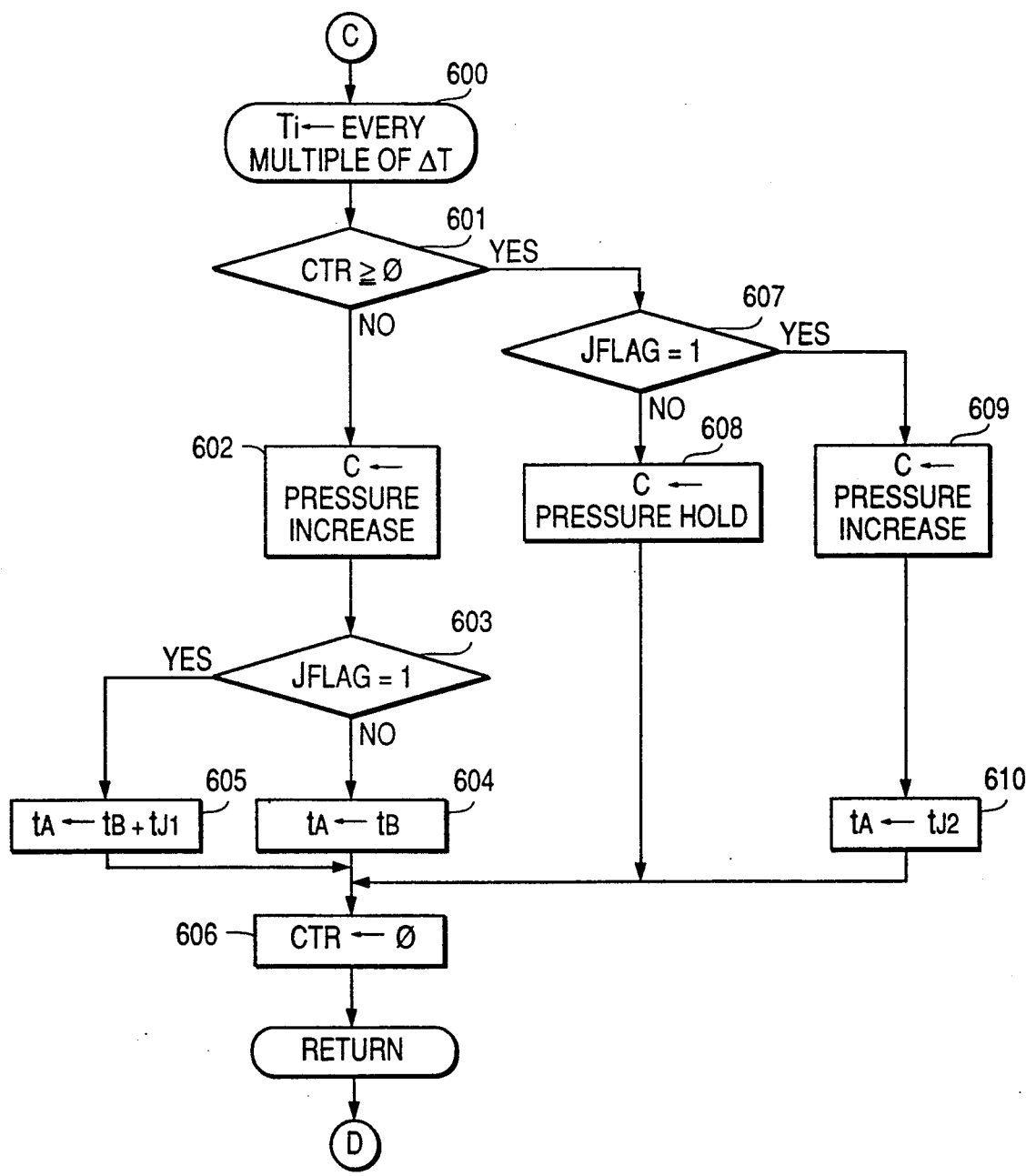

With the device having the fourth function, as shown in FIG. 13, every time the content Ti of the timer reaches the value equal to a multiple of $\Delta T$ ($\Delta T = n \cdot \Delta t$) (Step 600), the sign of the content CTR of the counter is checked in Step 601. If not $0 \leq CTR$, after setting the brake pressure control command C to pressure increase in Step 602, it is judged whether or not $J_{FLAG}=1$ for the flag for the friction coefficient of the road surface (Step 603). If not $J_{FLAG}=1$, the $t_A$ value is set to the reference time $t_B$ of minor pressure increase in Step 604. Then after resetting the counter in Step 606, the program returns to the entrance D in FIG. 7. If $J_{FLAG}=1$ in Step 603, the time $t_A$ of pressure increase is set to $t_A = t_B + t_{JI}$ by adding a predetermined correction time $t_{JI}$ for fluctuations in the friction coefficient to the reference time $t_B$ of minor pressure increase (Step 605). The program then returns to the entrance D in FIG. 7 through Step 606.

If $0 \leq CTR$ in Step 601, it is judged whether or not $J_{FLAG}=1$ in Step 607. If not $J_{FLAG}=1$, after setting the brake pressure control command C to pressure hold in Step 608, the program returns to the entrance D in FIG. 7 through Step 606. If $J_{FLAG}=1$, the brake pressure control command C is set to pressure increase in step 609 and in Step 610 the pressure increase time $t_A$ is set to a special pressure increase time $t_{J2}$ for correcting fluctuations in the friction coefficient, i.e. $t_A = t_{J2}$. The program then returns to the entrance D in FIG. 7 through Step 606.

With the device having the fifth function, in Step 116, it is judged whether or not the Ti value is equal to a multiple of $\Delta T$. If it is, the program proceeds to a routine between an entrance C and an exit D in FIG. 14.

Figure 14:
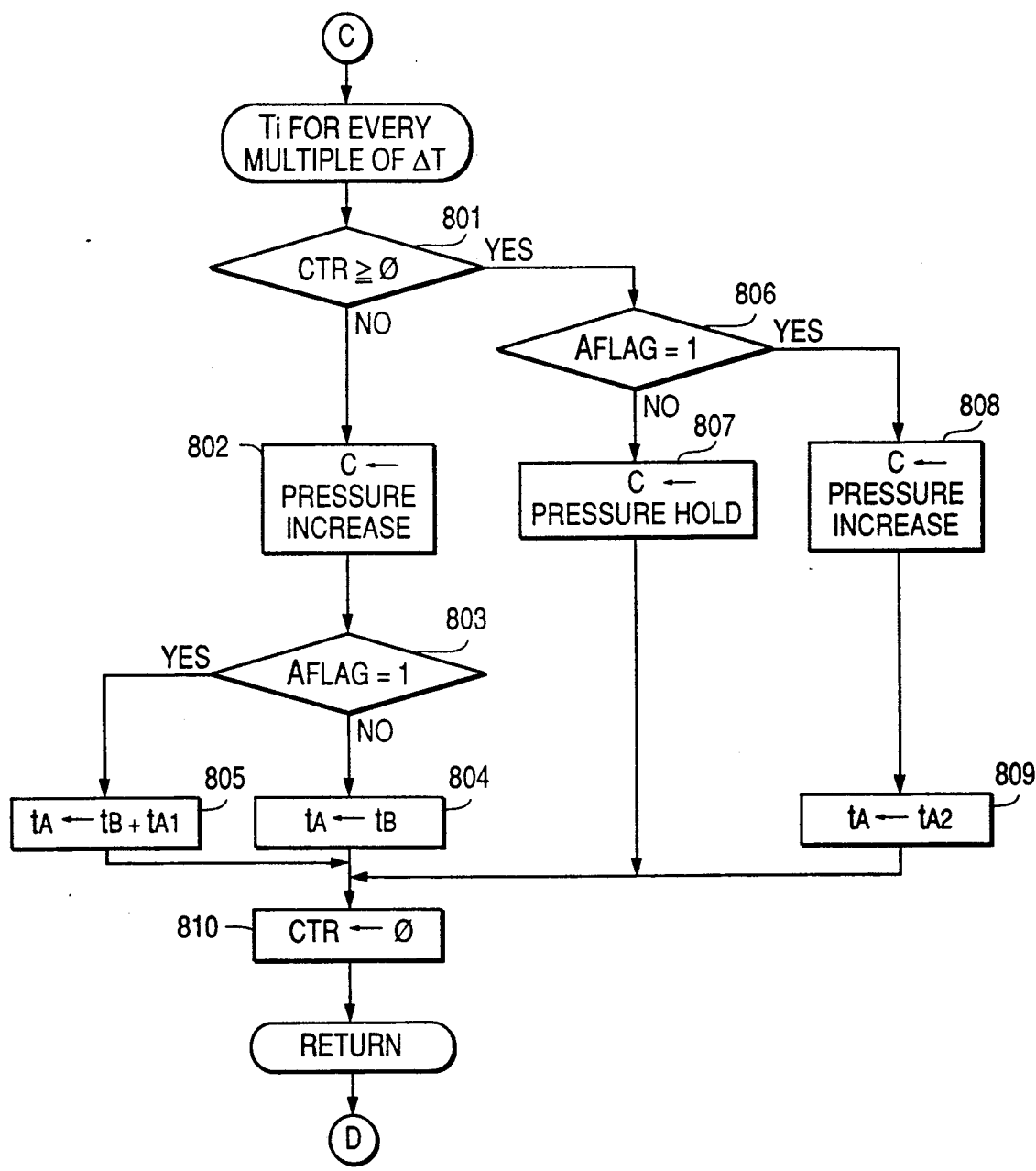

In the routine shown in FIG. 14, every time the content Ti of the timer reaches a value equal to a multiple of $\Delta T$, the sign of the content CTR of the counter is checked (Step 801). If not $0 \leq CTR$, after setting the brake pressure control command C to pressure increase in Step 802, it is judged whether or not the rough road flag $A_{FLAG}$ is set to 1, in other words, which one of the operations in Steps 404 and 405 was executed as a result of the judgement in Step 403 in FIG. 9. If not $A_{FLAG}=1$, in Step 804, the pressure increase time $t_A$ is set to the reference minor pressure increase time $t_B$ and the counter is reset (Step 810). The program then returns to the entrance D in FIG. 7. If $A_{FLAG}=1$ in step 803, in Step 805, the pressure increase time $t_A$ is set to $t_A = t_B + t_{AI}$ by correcting it by adding a predetermined correction time $t_{AI}$ while the vehicle is running on a rough road to the reference minor pressure increase time $t_B$. The program then returns to the entrance D in FIG. 7 through Step 810.

If $0 \leq CTR$ in Step 801, in Step 806, it is judged rough road flag $A_{FLAG}=1$. If not $A_{FLAG}=1$, the brake pressure control command C is set to pressure hold (Step 807). The program then returns to the entrance C in FIG. 7 through Step 810. If $A_{FLAG}=1$, the brake pressure control command C is set to pressure increase (Step 808) and in Step 809, the pressure increase time $t_A$ is set to a special pressure increase time $t_{A2}$ while running on a rough road, i.e. to $tA = t_{A2}$. Then the program returns to the entrance D in FIG. 7 through Step 810.

If the Ti value is not a multiple of $\Delta T$ in Step 116, in Step 117, it is judged whether or not the minor pressure increase execution time $t_A$ is zero. If $t_A=0$, after setting the brake pressure control command C to pressure hold (Step 118), the program proceeds to Step 121. In Step 117, if not $t_A=0$, in Step 119, one count is subtracted from the minor pressure increase time $t_A$ and the brake pressure control command C is set to minor pressure increase (execution of pressure increase) (Step 120). The program then proceeds to Step 121.

In Step 121 in FIG. 7, it is judged whether or not the content Ti of the timer is Ti=0. If not Ti=0, the program returns to the starting point of the control cycle (Step 126). If Ti=0, it is judged whether or not $F_{THRI} \leq Fi$ (control variable) (Step 122). If $F_{THRI} \leq Fi$, the program returns to the starting point of the control cycle (Step 126) after setting the brake pressure control command C to pressure reduction in Step 125, excepting the device having the third function.

If $F_i < F_{THR1}$ in Step 122, in Step 123, it is judged whether or not $F_i \leq F_{THR2}$. If $F_i \leq F_{THR2}$, the brake pressure control command C is set to pressure increase (Step 114). The program then returns to the starting point of the control cycle. If $F_{THR2} < F_i$, the program returns to the starting point of the control cycle after setting the brake pressure control command C to pressure hold (in Step 124).

Figure 15:
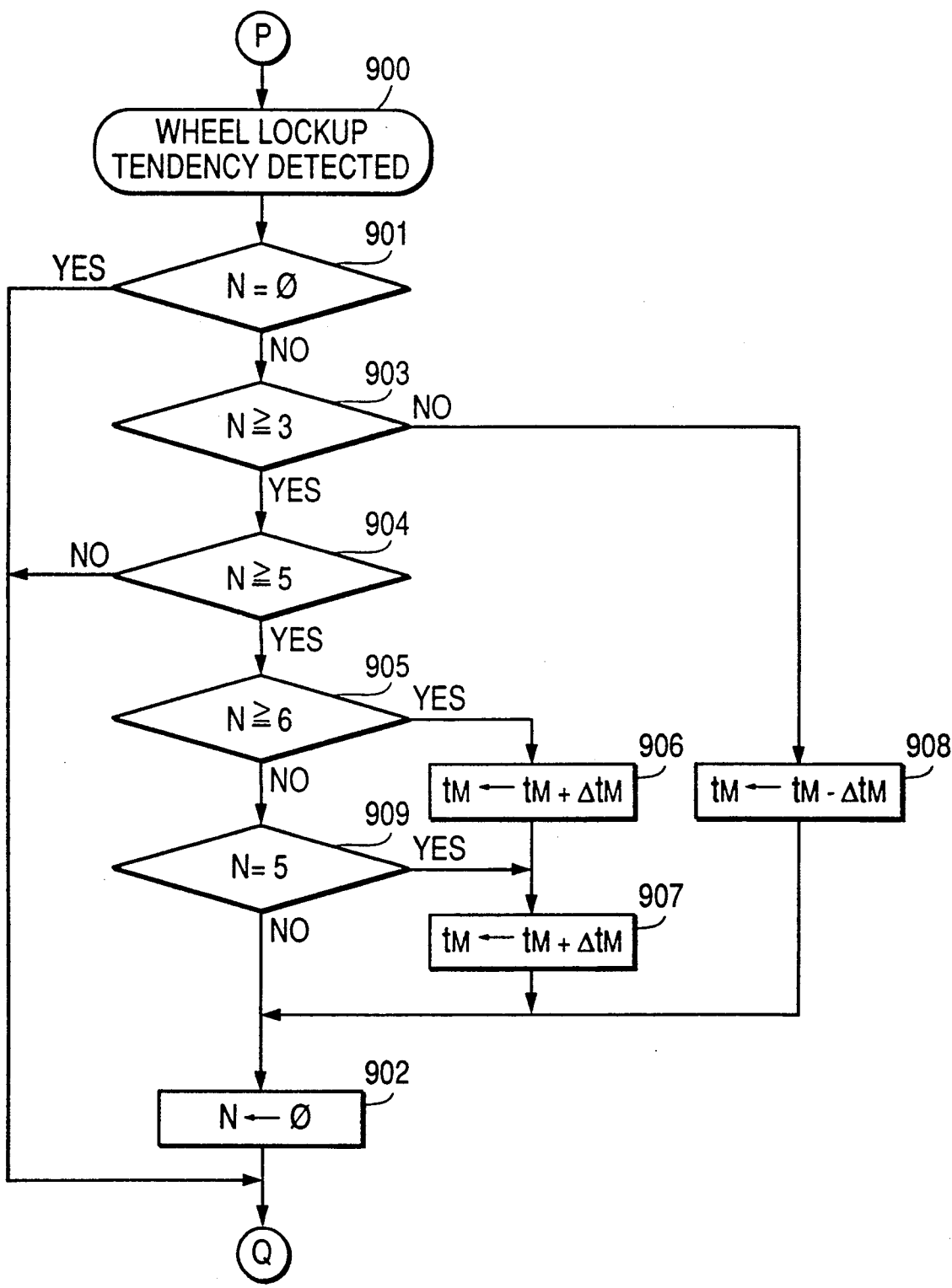

With the device having the third function, if $F_i \geq F_{THR1}$ in Step 122, the program proceeds to a routine between P and Q in FIG. 15. In this routine, every time a locking tendency of the wheels is detected (Step 900), it is judged whether or not the number of times N of executions of minor pressure increase in the preceding skid cycle is N = 0 (Step 901). If N=0, the program returns to the entrance Q. If not N=0, it is judged in Step 903 whether or not $3 \leq N$. If $3 \leq N$, it is judged whether or not $5 \leq N$ (Step 904). If $5 \leq N$, it is judged whether or not N=6 (Step 905). If N=6, the learning correction time $t_M$ is determined as the learning correction time $t_M$ in the preceding skid cycle $+ \Delta t_M$ (in Step 906) and in Step 907, $\Delta t_M$ is added to the thus determined $t_M$ value. The program then proceeds to Step 902.

If not $5 \leq N$ in Step 904, the program returns to the entrance Q in FIG. 7. If not N=6 in Step 905, it is judged in step 909 whether or not N=5. If N=5, in Step 907, the $t_M$ value is set to $t_M + \Delta t_M$. The program then proceeds to Step 902. If not N=5, the program proceeds directly to Step 902. If not $3 \leq N$ in Step 903, in Step 908, the learning correction time $t_M$ is determined as the learning correction time $t_M$ in the preceding skid cycle $t_M - \Delta t_M$. The program then proceeds to Step 902. In Step 902, the N value is set to zero. Then the program returns to the entrance Q in FIG. 7. In Step 125, the brake pressure control command C is set to pressure reduction. The program then returns to the starting point of the control cycle (Step 126).

Industrial Application

As described in detail, the wheel speed control device according to this invention can prevent vibrations and pitching of the vehicle body and increases in the braking distance resulting from insufficient brake pressure while the wheels are recovering from a locking state, which was impossible to detect using a conventional control device which operates based on differentiation type judgement. Thus, it will contribute greatly to improvements in the performance of a vehicle such as an automobile.

I claim:

1. A wheel speed control device comprising:
   a wheel speed calculating means for calculating a wheel speed Vw of each wheel of a vehicle based on a output Vi of a wheel speed sensor for each wheel;
   a vehicle speed calculating means for calculating a vehicle speed Vv;
   a wheel speed differentiating means for producing a differentiated output Vd of the wheel speed Vw of said wheel speed calculating means;
   a slip speed calculating means for calculating a slip speed Si of said each wheel from the wheel speed Vw of said wheel speed calculating means and the vehicle speed Vv of said vehicle speed calculating means;
   a first brake pressure controller for calculating a control variable from the differentiated output Vd of said wheel speed differentiating means and the output Si of said slip speed calculating means and for outputting, based on the results of the thus calculated control variable, a pressure increase, pressure hold or pressure reduction command to a brake control actuator to control a brake pressure on each wheel; and
   a second brake pressure controller;
   said second brake pressure controller comprising:
   (a) a means for judging whether or not said control variable calculated by said first brake pressure controller is between a first threshold value and a second threshold value which is larger than said first threshold value,
   (b) a means for judging, if said control variable is judged to between said first and second threshold values, whether or not said slip speed Si is larger than a predetermined threshold value,
   (c) a counter means for incrementing a value CTR thereof if said slip speed Si is judged to be equal to or larger than said predetermined threshold value and for decrementing the value CTR thereof if said slip speed Si is judged to be smaller than said predetermined threshold value, and
   (d) a first pressure increase means for checking the value CTR of said counter means at predetermined time intervals and for issuing a command to hold the brake pressure if $CTR \geq 0$ and issuing a command to increase the brake pressure at a low rate if $CTR < 0$, wherein a time duration of each low-rate pressure increase by said first pressure increase means is increased if a current value CTR is smaller than a previous value CTR and decreased if the current value CTR is larger than the previous value CTR, and wherein the time duration of said each low-rate pressure increase by said first pressure increase means is increased or decreased according to a number of times a low-rate pressure increase operation is executed in a previous skid cycle.

2. A wheel speed control device as claimed in claim 1, wherein said second brake pressure controller further comprises a second pressure increase means, which is distinct from said first pressure increase means, for increasing the braking pressure at a rate higher than the rate of pressure increase carried out by said first pressure increase means if the brake pressures on right and left front wheels are not reduced over a predetermined time denoting a threshold value representing a fluctuation of a friction coefficient.

3. A wheel speed control device as claimed in claim 1, wherein said second brake pressure controller further comprises an acceleration detector for detecting acceleration in a vertical direction of the vehicle and a second brake pressure increase means responsive to said acceleration detector, which is distinct from said first brake pressure means, for increasing the brake pressure for a longer time period and at a higher rate than the pressure increase carried out by said first pressure increase means.

* * * * *